United States Patent [19]

Rispoli et al.

[11] 4,260,637

[45] Apr. 7, 1981

[54] SELF-STICKING BREAD CRUMB COMPOSITION AND PROCESS

[75] Inventors: Joseph M. Rispoli, Massapequa Park; Janice R. Shaw, Yonkers, both of N.Y.

[73] Assignee: General Foods Corporation, White Plains, N.Y.

[21] Appl. No.: 25,957

[22] Filed: Apr. 2, 1979

[51] Int. Cl.³ ............................................. A23L 1/216
[52] U.S. Cl. ......................................... 426/96; 426/99; 426/289; 426/293; 426/296; 426/555; 426/652
[58] Field of Search ................. 426/296, 289, 555, 96, 426/102, 99, 618, 652, 293, 291

[56] References Cited

U.S. PATENT DOCUMENTS

| | | | |
|---|---|---|---|
| 2,623,825 | 12/1952 | Tressler et al. | 426/555 |
| 3,586,512 | 6/1971 | Mancuso et al. | 426/102 |
| 3,666,491 | 5/1972 | Touba | 426/293 |
| 3,843,827 | 10/1974 | Lee et al. | 426/293 |
| 3,870,803 | 3/1975 | Siems et al. | 426/555 |
| 4,068,009 | 1/1978 | Rispoli et al. | 426/296 |

FOREIGN PATENT DOCUMENTS

| | | | |
|---|---|---|---|
| 980164 | 12/1975 | Canada | 426/92 |
| 48-34902 | 10/1973 | Japan | 426/92 |

Primary Examiner—Raymond N. Jones
Assistant Examiner—George C. Yeung
Attorney, Agent, or Firm—Mitchell D. Bittman

[57] ABSTRACT

A bread crumb composition is provided which adheres to a moistened comestible during coating and cooking without the necessity of batter coating the comestible. The composition comprises bread crumbs having a particle size wherein at least a majority of the crumbs are retained on a 20 mesh U.S. Standard Screen after passing through a 5 mesh U.S. Standard Screen, and an adhesive, the adhesive having been applied to and adhering to the surface of the crumbs. The adhesive contains a protein at a level of at least about 1% by weight of the crumbs and optionally may also contain a starch and/or a gum.

22 Claims, No Drawings

SELF-STICKING BREAD CRUMB COMPOSITION AND PROCESS

BACKGROUND OF THE INVENTION

A common method of preparing comestibles such as meat, fish and poultry is to batter-coat the comestible, bread it, and then cook it by pan-frying or deep-fat frying. This develops into a coating which is crisp and tasty and has a uniform brown color. Alternative methods for preparing a breaded comestible have been suggested, as in U.S. Pat. No. 3,586,512 by Mancuso et al, U.S. Pat. No. 3,843,827 by Lee et al and U.S. Pat. No. 4,068,009 by Rispoli et al which prepare a baked, breaded comestible with a fried texture and appearance. However, when the size of the bread crumb particles are sufficiently large it has generally been necessary that a batter coating be employed to provide the adhesion needed to secure the bread crumbs to the comestible. While batter coating the comestible prior to breading is an effective means of securing adherance of the bread crumbs to the comestible, it does provide for an additional preparation step and requires the use of a batter.

Accordingly, it is a main feature of this invention to provide a bread crumb composition with excellent and uniform adherence of the bread crumbs to the comestible during coating and cooking but without the necessity of batter coating the comestible.

It is a further feature of this invention to provide a bread crumb composition which entails easy and convenient preparation for the consumer by a onestep coating procedure.

Another embodiment of this invention is to provide a bread crumb composition for use in preparing a baked, coated comestible with the taste, texture and appearance of a fried, coated comestible.

SUMMARY

Briefly stated, the features of this invention are accomplished by coating a moistened comestible with a unique dry bread crumb composition and then cooking the coated comestible. The bread crumb composition comprises bread crumbs and an adhesive, the adhesive having been applied to and adhering to the surface of the crumbs. The bread crumbs have a particle size wherein at least a majority of the crumbs are retained on a 20 mesh U.S. Standard Screen after passing through a 5 mesh U.S. Standard Screen and wherein not more than 10% of the crumbs by weight are retained on a 5 mesh U.S. Standard Screen. The adhesive contains a protein at a level of at least about 1% by weight of the crumbs, and can also contain a starch and/or a gum. Preferably, the adhesive is applied to the surface of the crumbs with an edible oil.

DETAILED DESCRIPTION OF THE INVENTION

The bread crumb composition of this invention comprises bread crumbs of a critical particle size with an adhesive applied to the surface of the crumbs. The particle size of the bread crumbs is critical in that when the size of the bread crumbs is sufficiently large, bread crumbs will no longer uniformly adhere to the surface of the comestible during coating and cooking without some sort of cohesive force. The prior art commonly provided this cohesive force by batter coating the comestible prior to applying the bread crumbs. The instant invention provides this cohesive force through use of an adhesive on the surface of the bread crumbs. Upon coating a moistened comestible with the bread crumb composition, the adhesive provides the cohesive force needed to insure uniform adherence of the bread crumbs on the surface of the comestible during coating and cooking.

Generally, the bread crumbs must be of a particle size wherein at least 50% by weight of the crumbs are retained on a 20 mesh U.S. Standard Screen after passing through a 5 mesh U.S. Standard Screen and wherein not more than 10% of the crumbs are retained on a 5 mesh U.S. Standard Screen. Preferably, at least 75% by weight of the crumbs are retained on a 20 mesh U.S. Standard Screen after passing through a 5 mesh U.S. Standard Screen and optimally, at least 60% by weight of the crumbs pass through a 5 mesh U.S. Standard Screen and are retained on a 14 mesh U.S. Standard Screen. A preferred particle size distribution would be wherein 15 to 50% by weight of the crumbs pass through a 5 mesh U.S. Standard Screen and are retained on an 8 mesh U.S. Standard Screen, 60 to 85% by weight of the crumbs pass through a 5 mesh U.S. Standard Screen and are retained on a 14 mesh U.S. Standard Screen, 7 to 30% by weight of the crumbs pass through a 14 mesh U.S. Standard Screen and are retained on a 20 mesh U.S. Standard Screen and 5 to 15% by weight of the crumbs pass through a 20 mesh U.S. Standard Screen.

The bread crumbs may be of a formulation and may be processed by any means common in the art. Preferably, for optimum crispness, Japanese bread crumbs are employed. By Japanese bread crumbs, what is meant is that the bread crumbs consist essentially of wheat flour, yeast and salt and having an elongated, porous and striated shape and structure (as described in U.S. Pat. No. 4,068,009 by Rispoli et al). Other ingredients, such as seasonings, shortening, milk solids, sugar, minor amounts of other flours, (e.g., rice, barley, soy, etc.) whey solids, etc., may also be added to the Japanese bread crumb formulation.

Essential to the bread crumb composition of this invention is an adhesive which is applied to and adheres to the surface of the bread crumbs. When the bread crumbs were of a particle size wherein 75% by weight of the crumbs were retained on an 18 mesh U.S. Standard Screen after passing through a 5 mesh U.S. Standard Screen and an effective amount of a protein source as an adhesive was applied to and adhered to the surface of the crumbs, then at least about 30% more of the crumbs by weight adhered to moistened chicken pieces during coating and cooking than when no adhesive was used.

The adhesive is present in an amount effective to enable the bread crumbs to adhere to, bind to or stick to the comestible when the bread crumb composition is coated onto the moistened comestible. The adhesive is generally present within the range of about 1 to 35% by weight of the bread crumbs. The adhesive critically comprises a protein at a level of at least about 1% by weight of the crumbs, and preferably, can additionally contain a gum and/or a starch. The protein may be whey protein, milk protein, soy isolate, gelatin, egg albumin, wheat gluten, etc., and mixtures thereof, and is generally present at a level of from about 1 to 20% by weight of the crumbs and preferably present at a level of from about 5 to 15% by weight of the crumbs. In addition to the protein, the adhesive may also contain a starch, generally at a level up to about 10% by weight of the crumbs. The starch may be a raw, modified (chemical or physical) or pregelatinized starch, for example, starches such as cornstarch, waxy maize starch and tapioca starch are all effective in enhancing the cohesive properties of the adhesive. The adhesive may also contain a gum, generally at a level up to about 5% by weight of the crumbs. The gum may be a natural, modified or synthetic gum, for example, gum arabic, gum tragacanth, locust bean gum, or cellulose derivatives such as methylcellulose, carboxymethylcellulose or microbial gums such as xanthan gum are all effective in enhancing the cohesive properties of the adhesive. Other edible materials which enhance the cohesive properties of the adhesive may also be employed in combination with the protein in the adhesive.

Critical to the bread crumb compositon of this invention is that the adhesive is applied to and adheres to the surface of the bread crumbs. Without the adhesive adhering to the surface of the bread crumbs, the bread crumbs, due to their relatively large particle size would not uniformly coat and adhere to the surface of the comestible when the moistened comestible is coated with the bread crumb composition and cooked. If the adhesive is simply dry mixed with bread crumbs of the critical particle size of this invention without having been applied to and adhering to the surface of bread crumbs, then upon coating a moistened comestible with this mixture and cooking the coated comestible, the resultant coating would be nonuniform, with a substantial amount of the crumbs falling off during coating, handling and cooking.

The adhesive may be applied to the surface of the bread crumbs by any number of means. Preferably, the adhesive is applied to the surface of the bread crumbs with an edible oil by, for example: blending the adhesive with the crumbs prior to applying (e.g., spraying) the edible oil onto the crumbs; or, applying (e.g., spraying) the edible oil onto the crumbs and then blending the adhesive with the crumbs; or, suspending the adhesive in the edible oil prior to applying (e.g., spraying) the edible oil onto the crumbs. Generally, the level of edible oil which is applied to the surface of the bread crumbs is within the range of about 1.5% to 40% by weight of the crumbs and preferably, within the range of about 1.5 to 15% by weight of the crumbs. Preferably the edible oil is a vegetable oil such as corn oil, soybean oil, peanut oil, olive oil, etc., or blends thereof.

Another means of applying the adhesive to the surface of the crumbs is by forming a solution or dispersion of the adhesive in a solvent (e.g., water) then applying (e.g., spraying) the solution or dispersion onto the crumbs, followed by drying the crumbs. While the above means are suggested for applying the adhesive to the surface of the crumbs, other carriers, solvents, or means may be employed so long as the adhesive is applied to and adheres to the surface of the bread crumbs and the resultant bread crumb composition is dry, i.e., free from liquid and free-flowing.

When the adhesive contains more than a single protein source, it may be desirable, for uniformity, to dissolve or disperse the various components of the adhesive (e.g., various proteins, gums or starches) in a solvent, followed by drying (e.g., spray or freeze drying) the solution or slurry and then grinding. The resultant adhesive can then be uniformly applied to the bread crumb surface.

The bread crumb composition may also contain seasonings such as salt, dextrin, pepper, garlic, paprika, sugar, onion powder, monosodium glutamate, etc., generally at levels up to about 15% by weight of the crumbs. Preferably, the seasonings are applied to the surface of the bread crumbs along with the adhesive by, for example, applying the seasonings and adhesive to the surface of the bread crumbs with an edible oil. The dry coating composition may also contain additional ingredients, such as processing aids, preservatives, coloring, etc.

In a preferred embodiment of this invention, Japanese bread crumbs which have been uniformly browned have an adhesive applied to the crumb surface with an edible oil, such that upon baking a comestible coated with the bread crumb composition the resulting comestible is imparted with the taste, texture and appearance of a fried comestible. This embodiment not only provides a convenient, easy, one-step preparation but it also avoids the messiness, expense and danger of frying as well as the dietary aspects of fried foods, which are considered undesirable by some.

To coat the comestible with the bread crumb composition, the comestible must be moistened, i.e., the surface of the comestible must be moist, damp or slightly wet. This can be commonly carried out by spraying the comestible with water or dipping the comestible in water. The moistened comestible can then be coated with the bread crumb composition by any means common in the art, such as applying the composition to the moistened comestible in a closed bag containing the bread crumb composition or completely covering the moistened comestible with the composition and then pressing the composition firmly onto the moistened comestible. When the dry bread crumb composition comes into contact with the moistened surface of the comestible, the cohesive properties of the adhesive are activated enabling the bread crumb composition to adhere to the comestible surface.

After the bread crumb composition is coated onto the moistened comestible, the coated comestible is then cooked in a conventional manner, such as by frying or baking. Generally, when frying the coated comestible, the temperature of the fat or oil should be maintained within the range of about 260° F. to 375° F. (125° C. to 190° C.), with care being taken not to burn the coating or comestible during frying. Baking may be carried out in a microwave oven as well as a conventional oven. Generally, the temperature in a conventional oven should be maintained within the range of about 325° F. to 450° F. (160° C. to 235° C.). Preferably, the coated comestible is baked on a surface coated with a minimal amount of oil, that is, at least a sufficient amount of oil to cover the surface. This is done not only to prevent sticking of the comestible to the surface, but to enhance the development of a fried taste, texture and appearance in the resultant baked comestible.

Upon coating and cooking a comestible coated with the bread crumb composition, excellent and uniform adherence of the bread crumbs to the comestible is observed as well as a coating with improved crispness. This uniform adherence is observed even when the comestible is irregularly shaped (e.g., chicken pieces) thus overcoming difficulties which have been common in the art. Appropriate comestibles to be coated with the bread crumb composition of this invention include such categories as meat, fish, poultry and vegetables.

For example, chicken pieces, chicken cutlets, pork chops, fish filets, or vegetable strips are all suitable.

The following examples illustrate the various facets of the invention. It should be understood, however, that these examples are merely meant to be illustrative and the invention should not be limited thereto.

EXAMPLE I

The following ingredients and process were employed to prepare the bread crumb composition:

|  | Grams | % By Weight of the Bread Crumb Composition |
|---|---|---|
| Bread crumbs | 148 | 74.0 |
| Protein blend | 20 | 10.0 |
| (a) 50% by weight sodium caseinate |  |  |
| (b) 50% by weight egg white solids |  |  |
| Seasoning blend | 22 | 11.0 |
| (a) salt |  |  |
| (b) paprika |  |  |
| (c) monosodium glutamate |  |  |
| (d) white pepper |  |  |
| Vegetable oil | 10 | 5.0 |

The bread crumbs consisted essentially of wheat flour, yeast and salt, had an elongated, porous and striated shape and structure and had been toasted to uniformly brown the crumbs. The bread crumbs had a particle size wherein 35% by weight of the crumbs were retained on an 8 mesh U.S. Standard Screen after passing through a 5 mesh U.S. Standard screen, 37% by weight of the crumbs were retained on a 14 mesh U.S. Standard Screen after passing through an 8 mesh U.S. Standard Screen, 20% by weight of the crumbs were retained on a 20 mesh U.S. Standard Screen after passing through a 14 mesh U.S. Standard Screen and 8% by weight of the crumbs passed through a 20 mesh U.S. Standard Screen. The protein blend and seasoning blend were mixed together and then added to the bread crumbs in a rotating coating kettle. The protein and seasoning blends were applied to and adhered to the surface of the bread crumbs by spraying vegetable oil onto the mixture of crumbs, protein and seasoning in the rotating coating kettle.

A 2½ pound (1.13 kg) chicken was cut up into pieces and the pieces were then dipped into water. Then each moistened chicken piece was completely covered with the bread crumb composition (about 120 grams of composition for the chicken pieces) and the bread crumb composition was firmly pressed onto each piece.

The coated chicken pieces were then placed skin side down on a 10"×15" (254 mm×381 mm) baking pan which had ¼ cup (59 ml) of oil covering the pan surface. The coated chicken pieces were then baked for 25 minutes at 400° F. (204° C.), turned, and baked for an additional 25 minutes.

The resultant baked, coated chicken pieces were found to have a continuous, uniform, adherent and crisp coating. The baked, coated chicken was found to have the taste, texture and appearance of fried chicken.

EXAMPLE II

The following ingredients and process were employed to prepare the bread crumb composition:

|  | % By Weight of the Bread Crumb Composition |
|---|---|
| Bread Crumbs | 63.1 |
| Protein/Starch Blend |  |
| Egg white solids | 10.0 |
| Pregelatinized modified waxy maize starch | 5.0 |
| Seasoning Blend |  |
| Salt | 6.4 |
| Paprika | 3.9 |
| Monosodium Glutamate | 1.4 |
| White Pepper | 0.2 |
| Vegetable Oil | 10.0 |

The protein/starch blend and seasoning blend were mixed together then added in a rotating coating kettle to bread crumbs having a composition and particle size as in Example I. The oil was sprayed onto the mixture in the rotating coating kettle resulting in the protein, starch and seasoning adhering to the surface of the bread crumbs.

Eight ½ inch (1.3 cm) center cut pork chops were dipped in water, then each chop was completely covered with the bread crumb composition (about 120 gms of composition for the 8 pork chops) and the bread crumb composition was firmly pressed onto each piece. The coated chops were placed on a 10"×15" (254 mm×381 mm) baking pan which had 2 tablespoons (30 ml) of oil covering the pan surface. The chops were baked for 30 minutes at 400° F. (204° C.) then turned and baked 20 minutes longer.

The resultant baked, coated chops were found to have a continuous, uniform, adherent and heavy coating which was extremely crisp and with the meat itself being tender and moist.

EXAMPLE III

The following ingredients and process were employed to prepare the bread crumb composition:

|  | Gms | % By Weight of Solids of the Bread Crumb Composition |
|---|---|---|
| Bread Crumbs | 75.00 | 78.21 |
| Egg White Solids | 10.00 | 10.43 |
| Gum Arabic | 0.90 | 0.93 |
| Water | 17.10 | — |
| Spice Blend (salt, paprika and pepper) | 10.00 | 10.43 |

A 5% solution of gum arabic was prepared by dispersing the gum arabic in water. The bread crumbs (of a composition and particle size as in Example I) were mixed with the egg white solids and the spice blend in a rotating coating kettle. The gum arabic dispersion was then sprayed onto the mixture in the rotating coating kettle followed by spreading the coated crumbs onto a tray and drying the crumbs in an oven at a temperature less than 200° F. (93° C.).

A 2½ pound (1.13 Kg) chicken was cut up into pieces, and the pieces were then dipped in water. Then each moistened chicken piece was completely covered with the bread crumb composition (about 120 grams of composition for the chicken pieces), the crumbs being firmly pressed onto each piece. Oil at a level of 1½ cups (356 ml) was preheated in a 12 inch (305 mm) electric skillet and then each piece was fried in the oil for approximately 40 minutes, turning the pieces frequently and reducing the temperature as needed to prevent burning.

The resultant fried, coated chicken pieces were found to have a continuous, uniform and crisp coating which exhibited excellent adhesion to the chicken pieces, with the chicken itself being moist and tender.

EXAMPLE IV

An adhesive component was prepared by employing the following ingredients and process:

|  | % by Weight of the Adhesive Component | % by Weight of Solids of the Adhesive Component |
| --- | --- | --- |
| Egg White Solids | 25.0 | 36.3 |
| Sodium Caseinate | 20.0 | 29.0 |
| Pregelatinized modified waxy maize starch | 10.0 | 14.5 |
| Dextrin (10 DE) | 10.0 | 14.5 |
| Salt | 2.5 | 3.6 |
| Gum Arabic | 1.5 | 2.1 |
| Water | 31.0 | 0 |

The dry ingredients of the adhesive component, except for the gum arabic, were dry blended. The gum arabic was dispersed and mixed into the water at room temperature. The blended dry ingredients were then added to the gum arabic dispersion and blended to a dough-like consistency. The dough was then spread out to about a one inch (2.5 cm) thickness and freeze dried. The dried adhesive component was then ground and screened through a 40 mesh U.S. Standard Screen. The resultant adhesive component was then used in preparing the following bread crumb composition:

|  | % by Weight of the Bread Crumb Composition |
| --- | --- |
| Bread Crumbs, Toasted | 63.1 |
| Adhesive Component | 15.0 |
| Seasoning Blend (salt, paprika, monosodium glutamate, pepper) | 11.9 |
| Vegetable Oil | 10.0 |

The seasoning blend was mixed in a rotating coating kettle with the bread crumbs (of a size and composition as in Example I), followed by spraying vegetable oil onto the seasoned crumbs. The adhesive component was then mixed with the seasoned oiled crumbs in the rotating coating kettle resulting in the adhesive component adhering to the surface of the bread crumbs.

Pork chops were then coated with the bread crumb composition and baked as in Example II. The resultant baked, coated pork chops were found to have a uniform, adherent, heavy and crisp coating with the pork itself being moist and tender.

What is claimed is:

1. A dry, self-sticking bread crumb composition which adheres when coated onto a moistened comestible, comprising:
   bread crumbs having a particle size wherein at least 50% by weight of the crumbs are retained on an 20 mesh U.S. Standard Screen after passing through a 5 mesh U.S. Standard Screen and wherein not more than 10% by weight of the crumbs are retained on a 5 mesh U.S. Standard Screen; and,
   an amount of an adhesive effective to bind the crumbs to a moistened comestible, said adhesive containing a protein, said protein being present at a level of at least about 1% by weight of the crumbs, said adhesive having been applied to and adhering to the surface of said crumbs.

2. Composition of claim 1 wherein said protein is present at a level of about 1 to 20% by weight of the crumbs.

3. Composition of claim 2 wherein at least 75% by weight of the crumbs are retained on an 20 mesh U.S. Standard Screen after passing through a 5 mesh U.S. Standard Screen.

4. Composition of claim 2 wherein at least 60% by weight of the crumbs pass through a 5 mesh U.S. Standard Screeen and are retained on a 14 mesh U.S. Standard Screen.

5. Composition of claim 2 wherein the adhesive further contains a material chosen from the group consisting of starch, gum and mixtures thereof.

6. Composition of claim 2 wherein the protein is chosen from the group consisting of whey protein, milk protein, soy isolate, gelatin, egg albumin, wheat gluten, and mixtures thereof.

7. Composition of claim 5 wherein the level of the starch does not exceed about 10% by weight of the crumbs and the level of gum does not exceed about 5% by weight of the crumbs.

8. Composition of claims 1 or 7 wherein the adhesive is applied to the surface of the crumbs with an edible oil.

9. Composition of claim 8 wherein the edible oil is a vegetable oil.

10. Composition of claim 8 further comprising a seasoning which is applied to the surface of the crumbs with the edible oil.

11. Composition of claims 1 or 7 wherein the applied adhesive is a solution of adhesive dried on the surface of said crumbs.

12. Composition of claims 1 or 7 wherein the applied adhesive is a dispersion of adhesive dried on the surface of said crumbs.

13. Composition of claim 8 wherein the bread crumbs consist essentially of wheat flour, yeast and salt and have an elongated porous and striated shape and structure.

14. Composition of claim 13 wherein the edible oil is applied to the surface of the crumbs at a level of 1.5 to 40% by weight of the crumbs.

15. Composition of claim 7 wherein the starch is chosen from the group consisting of raw, pregelatinized and modified starches, and mixtures thereof and the gum is chosen from the group consisting of gum arabic, gum tragacanth, locust bean gum, xanthan gum, cellulose derivatives and mixtures thereof.

16. Composition of claim 1 wherein said protein is present at a level of about 5 to 15% by weight of the crumbs.

17. Process of preparing a cooked, coated comestible comprising:
   moistening a comestible;
   coating the moistened comestible with the bread crumb composition of claims 1, 5, or 7; and
   cooking said coated comestible.

18. Process of claim 17 wherein the coated comestible is cooked by frying.

19. Process of claim 17 wherein the coated comestible is cooked by baking.

20. Process of claim 19 wherein the coated comestible is baked on a surface covered with a minimal amount of oil.

21. Process of preparing a baked, coated comestible comprising:
moistening a comestible;
coating the moistened comestible with the bread crumb composition of claim 14, and
baking the coated comestible.

22. Process of claim 21 wherein the comestible is baked on a surface coated with a minimal amount of oil.

* * * * *